(12) United States Patent
Beer et al.

(10) Patent No.: US 6,186,293 B1
(45) Date of Patent: Feb. 13, 2001

(54) BRAKE DISC

(75) Inventors: Wilhelm Beer, Rüsselsheim; Christoph Veith, Kronberg; Horst Gehrig, Hofheim, all of (DE)

(73) Assignee: Continental Teves AG & Co., OHG (DE)

( * ) Notice: Under 35 U.S.C. 154(b), the term of this patent shall be extended for 0 days.

(21) Appl. No.: 09/180,807

(22) PCT Filed: May 15, 1996

(86) PCT No.: PCT/EP96/02080

§ 371 Date: Apr. 15, 1999

§ 102(e) Date: Apr. 15, 1999

(87) PCT Pub. No.: WO97/43559

PCT Pub. Date: Nov. 20, 1997

(30) Foreign Application Priority Data

Apr. 6, 1995 (DE) ................................. 195 12 934

(51) Int. Cl.⁷ ........................................ F16D 65/12
(52) U.S. Cl. .................................... 188/218 XL
(58) Field of Search ................. 188/268 XL, 264 A, 188/264 AA

(56) References Cited

U.S. PATENT DOCUMENTS

| 5,474,161 | 12/1995 | Eaton, III et al. |
|---|---|---|
| 5,480,007 | * 1/1996 | Hartford ........................ 188/18 A |
| 5,765,667 | * 6/1998 | Ross et al. ................. 188/218 XL |

FOREIGN PATENT DOCUMENTS

| 12 88 874 | 2/1969 | (DE) . |
|---|---|---|
| 78 678 | 12/1970 | (DE) . |
| 23 08 256 | 9/1974 | (DE) . |
| 79 06 416 | 5/1979 | (DE) . |
| 40 02 695 | 8/1991 | (DE) . |
| 0 128 758 | 12/1984 | (EP) . |
| 2 225 653 | 11/1974 | (FR) . |

* cited by examiner

*Primary Examiner*—Christopher P. Schwartz
(74) *Attorney, Agent, or Firm*—Rader, Fishman & Grauer PLLC

(57) ABSTRACT

In a brake disc (1) for disc brakes, at least one friction surface (4) is provided with at least one groove (6) which has a closed configuration without beginning and end and extends around the brake disc axis (17).

2 Claims, 3 Drawing Sheets

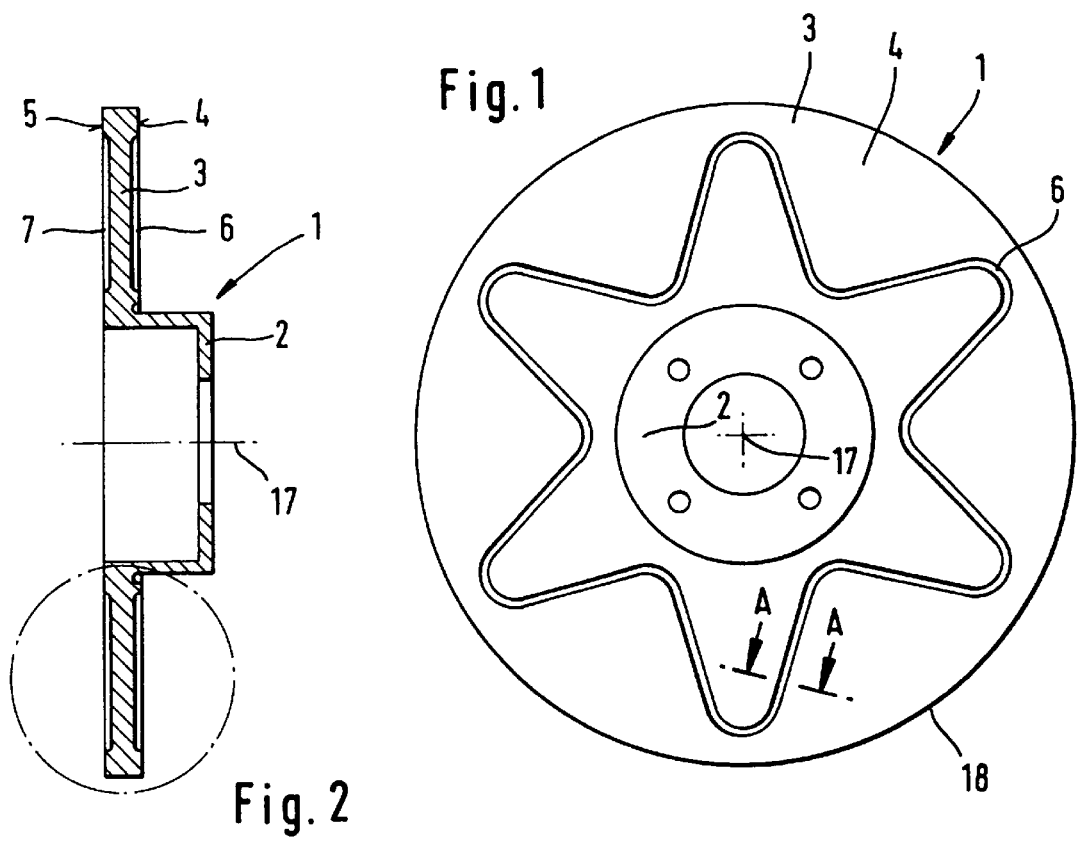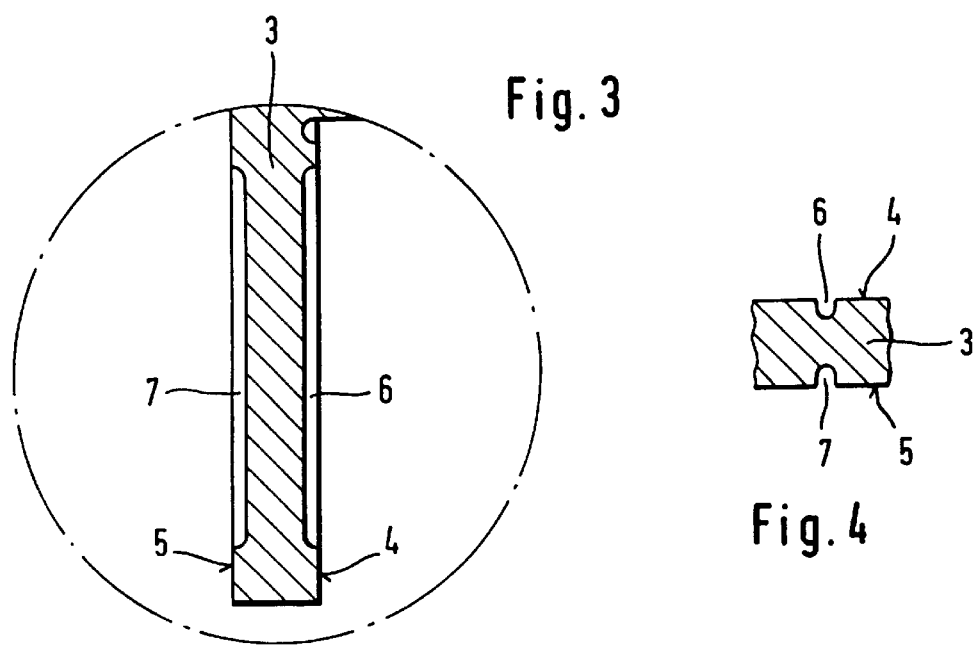

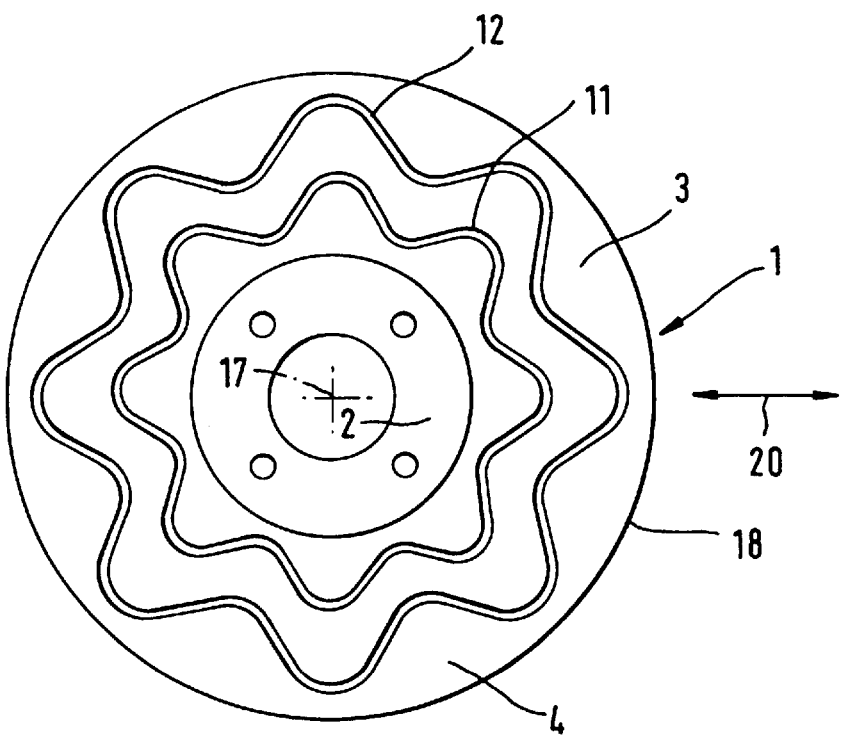
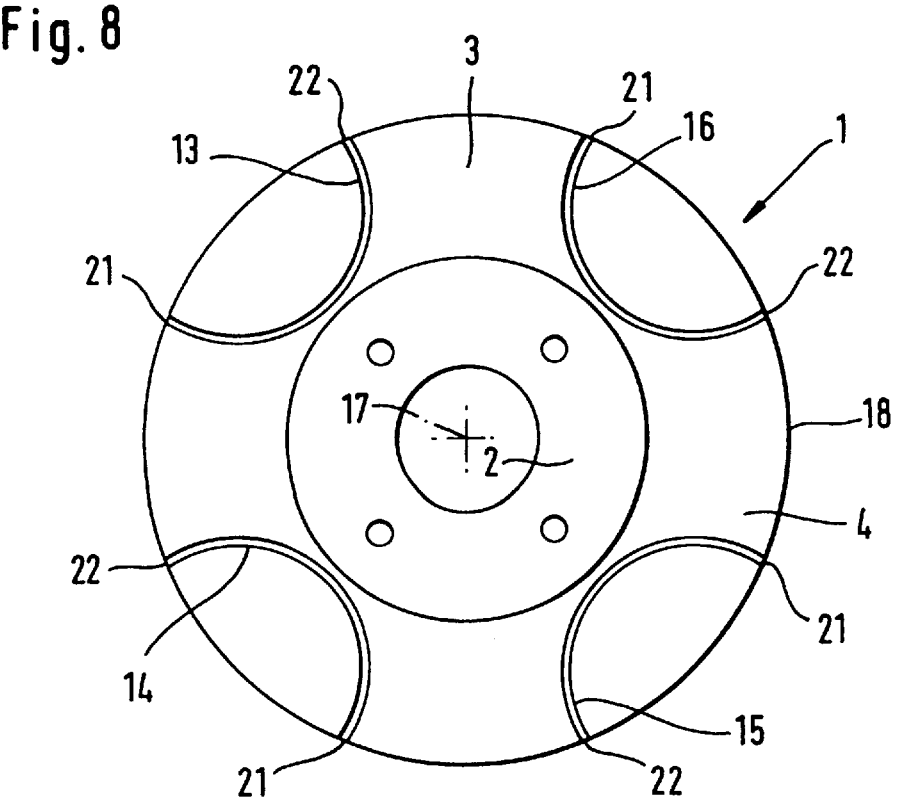

BRAKE DISC

BACKGROUND OF THE INVENTION

The present invention relates to a brake disc for disc brakes wherein at least one friction surface includes at least one groove.

Brake discs of this type are known in the art. The grooves cut into the friction surfaces of the brake discs are used to improve cooling of the brake disc by increasing the cooling surface and by better turbulences of the cooling air, on the one hand. On the other hand, the grooves are used to improve response of the brake when the brake disc is wet because water disposed on the brake disc can be taken up in the grooves. Another advantage of the grooves is that they permit being used as a wear indicator. German patent application No. 40 02 695 discloses a brake disc of this type with decoratively arranged grooves in the friction surfaces. When the brake disc has worn by an amount which corresponds to the depth of the grooves, the grooves will disappear. This permits a simple visual check from outside. As soon as the grooves are not visible any longer, the worn brake disc must be replaced.

However, the prior art brake discs suffer from the disadvantage that the structures of the grooves can only be made in a costly operation. A brake disc blank is generally machined in such a fashion that initially the friction surfaces are smoothed in a first processing machine. Subsequently, the brake disc must be removed from the first processing machine and clamped into a milling machine in a second step for cutting the grooves. With the rigid brake disc non-rotating, the grooves are then milled in by the milling machine. The miller is required to perform -a complicated two-dimensional movement.

An object of the present invention is to provide an improved brake disc for disc brakes and to permit brake disc manufacture to be reduced in costs especially as far as the application of the grooves is concerned.

SUMMARY OF THE INVENTION

This object is achieved basically by adapting the course of the groove across the friction surface to the requirements of a simple manufacture. When the groove as disclosed in the present invention has a closed configuration without a beginning and an end and extends around the brake disc axis, manufacture is possible in a particularly inexpensive manner. To produce the groove of the present invention, the chip-removing tool need not carry out a complicated two-dimensional movement. A one-dimensional stroke movement in combination with a rotational motion of the brake disc is sufficient. The closed configuration of the groove without beginning and end according to the present invention permits machining the groove in one single operation, without the need to withdraw and re-apply the machining tool. This achieves a major economy in time and also considerably reduced costs due to the resultant better rate of utilization of manufacturing machines.

By using a method of machining the friction surfaces according to the present invention, the brake disc may be provided with the groove of the present invention in the same machine which also smoothens the friction surfaces, thereby obviating the need to unclamp the brake disc from one machine and to clamp it into another one for cutting in the groove. The brake disc simply remains clamped in the same machine.

The tool intended for application of the groove produces the groove contour due to its profile and the shape and extension of the groove due to its stroke movement in combination with the rotational motion of the brake disc. The chip-removing tool can be a miller which produces the groove contour and performs the corresponding stroke movement. In a preferred embodiment of this process, however, a profile tool steel with the groove contour is used as a chip-removing tool so that the groove is produced by a turning operation. The tool has a particularly simple and inexpensive configuration in this embodiment.

In a straightforward embodiment of the brake disc of the present invention, each friction surface includes exactly one groove which extends like a wave between the radially inner and outer fringe area of the friction surface. It is ensured by the wave-shaped course that the groove extends over the entire radial area of the friction surface which is especially of benefit to the effect of taking up water when the brake disc is wet. On the other hand, the wave shape can be produced during manufacture in a particularly simple manner by the mentioned stroke movement of the chip-removing tool. In a first variation of the wave-shaped groove, it is provided that the groove is closed in itself after full movement around the brake disc axis. Depending on the rotational speed of the brake disc during manufacture, there may occur the need for a high frequency for the stroke movement of the chip-removing tool, however. This might involve shortcomings. In this case, an embodiment is recommended, wherein the groove is closed after two or more laps around the brake disc axis. This embodiment permits a considerably lower frequency for the stroke movement of the tool in relation to the rotational frequency of the brake disc.

In another possibility of reducing the stroke frequency of the chip-removing tool, each friction surface includes two or a plurality of grooves which extend like a wave between the radially inner and outer fringe areas of the friction surface and are arranged so as to be offset to each other in the direction of rotation of the brake disc. Each one of the grooves can be produced with a low stroke frequency. The friction surface covered by the groove portions is greater with two or more grooves than with only one single groove, with the stroke frequency being constant. Manufacture can also be effected by having two or a plurality of grooves cut one after the other by one and the same chip-removing tool.

If, however, the additional expenditure in time for the fabrication of a plurality of grooves is economically less favorable than an additional expenditure in equipment of the manufacturing machine, a machining process is advisable wherein two or a plurality of grooves are cut into the same friction surface simultaneously by two or a plurality of chip-removing tools.

A process of this type is especially suitable for a brake disc which includes two or a plurality of grooves that extend in wave shape in a radial partial area of the friction surface and are offset in relation to each other in a radial direction. In such an arrangement of the grooves, it is the length of stroke rather than the stroke frequency of the chip-removing tool which is reduced so that inadmissibly high accelerations of the tool will not occur, not even at an increased frequency.

In a preferred aspect of the process for cutting the groove, both friction surfaces of the brake disc are simultaneously machined and provided with grooves. For this purpose, the finishing machine must comprise chip-removing tools which are arranged opposite each other in pairs. When two grooves are intended to be provided on each friction surface, for example, four chip-removing tools are required in total, two of which are respectively arranged in pairs.

A preferred aspect of the present invention involves that the favorable process of cutting the grooves can also be employed when the closed pattern of the groove which is produced by the rotational motion of the brake disc and the stroke movement of the chip-removing tool has a greater radial extension than the associated friction surface of the brake disc. In this case, there is no closed configuration of the groove within the friction surface, but the path of the chip-removing tool leaves the radial area of friction surface outwardly in the course of the movement. Subsequently, the tool is immersed into the friction surface again from radially outwardly to the inside. The groove is generally subdivided into several grooves, and each groove opens with its two ends into the external edge of the brake disc.

Advantageously, each groove can be arranged wavelike or arcuately between the outer and inner fringe areas of the friction surface in order to sweep the entire radial area of the friction surface. In a preferred embodiment, four circular grooves which are evenly distributed over the periphery of the brake disc are provided which permit being manufactured in a particularly simple manner. Embodiments of the present invention will be explained in detail hereinbelow, making reference to the accompanying drawings.

BRIEF DESCRIPTION OF THE DRAWINGS

In the drawings,

FIG. 1 is a top view of a first embodiment of a brake disc of the present invention.

FIG. 2 is a cross-section taken through the same brake disc.

FIG. 3 is an enlarged cross-sectional view of FIG. 2.

FIG. 4 is a partial cross-section taken along line A—A of FIG. 1.

FIG. 7 is a fourth embodiment of a brake disc.

FIG. 8 is a fifth embodiment of a brake disc.

DETAILED DESCRIPTION OF THE DRAWINGS

Figure 5:
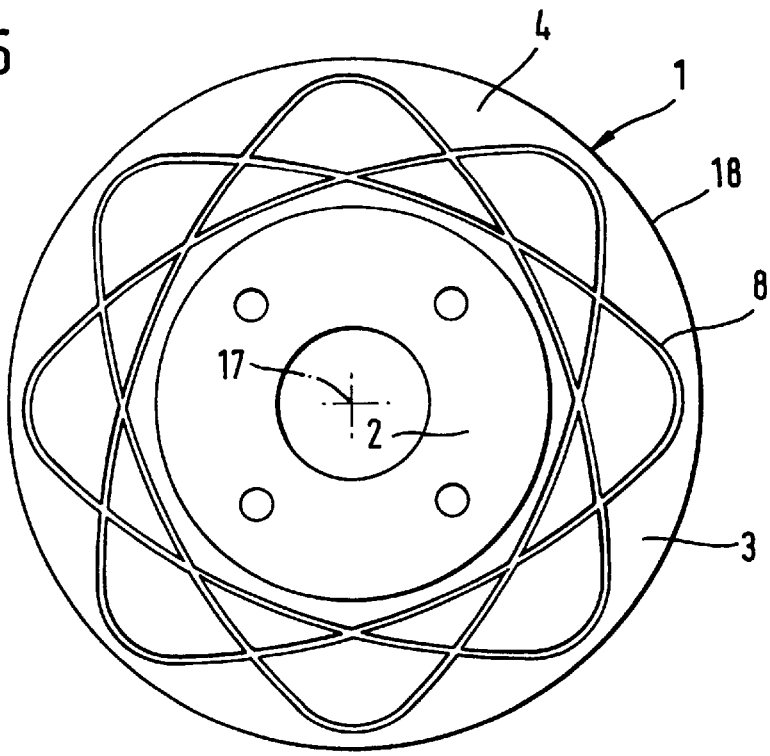
FIG. 5 is a second embodiment of a brake disc.

Brake discs 1 shown in all embodiments include a bowl-shaped retaining portion 2 and a friction ring 3 which has a friction surface 4, 5 on both axial sides. Each friction surface 4, 5 includes at least one groove 6 to 16, with the grooves 6 to 12 having a closed configuration without beginning and end and extending around the brake disc axis 17.

In the first embodiment shown in FIGS. 1 to 4, each friction surface 4, 5 has exactly one groove 6, 7 which extends wavelike between a radially inner and outer fringe area 18 of the friction surface 4, 5. The groove 6, 7 is closed after having moved one lap around the brake disc axis 17.

The embodiment shown in FIG. 5 differs from the above-mentioned embodiment only in that groove 8 is closed only after three laps around the brake disc axis 17. The result is that the stroke frequency of the chip-removing machining tool in producing the groove 8, advantageously, can be relatively low in relation to the rotational frequency of the brake disc 1.

Figure 6:
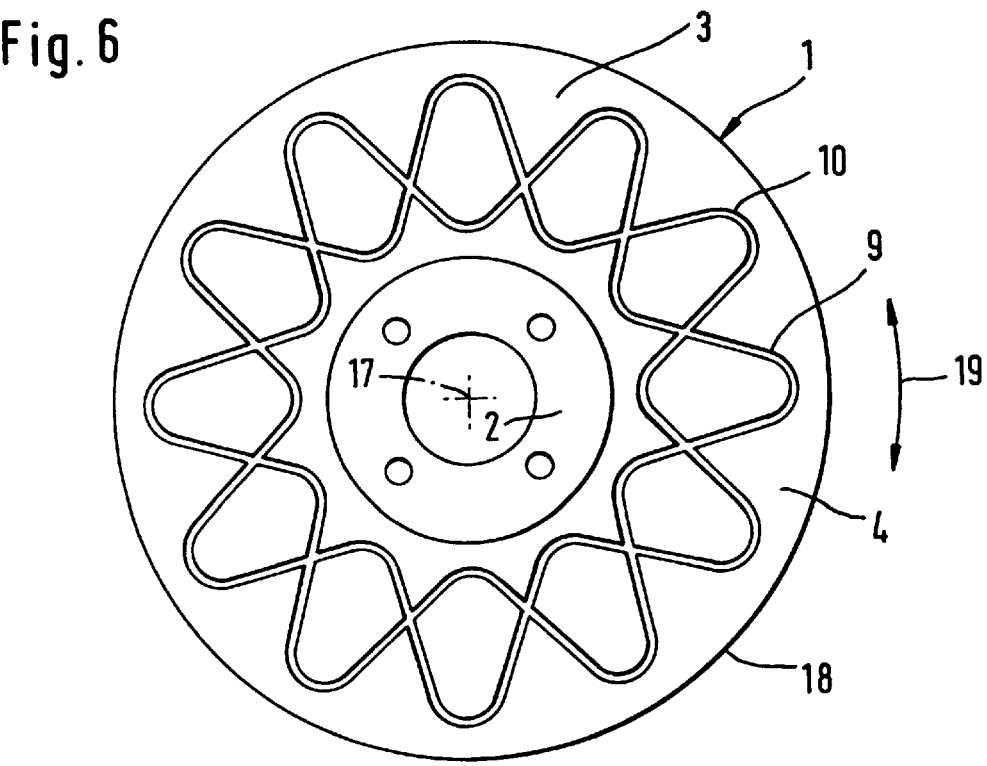
FIG. 6 is a third embodiment of a brake disc.

Another possibility of reducing the stroke frequency is illustrated in FIG. 6. Each friction surface 4, 5 of the brake disc 1 has two grooves 9, 10 which extend in the shape of a wave between the radially inner and outer fringe area 18 of the friction surface 4, 5 and are offset relative to each other in the direction of rotation 19 of the brake disc 1.

In the embodiment shown in FIG. 7, each friction surface 4, 5 has two grooves 11, 12 which extend wavelike in a radial partial area of the friction surface 4, 5 and are offset relative to each other in a radial direction 20 between the radially inner and outer fringe area 18 of the friction surface 4, 5. For the radially inner groove 11 there results a smaller diameter and a shorter length than for the radially outwardly disposed groove 12. The provision of two grooves 11, 12 favorably permits keeping the amplitude of the wave shape low.

The embodiment of the present invention shown in FIG. 8 mainly differs from the above-mentioned embodiments in that each friction surface 4, 5 has four grooves 13 to 16 which, however, are not closed. Instead, each groove has two ends 21, 22. Ends 21, 22 of grooves 13 to 16 open into the outer edge 18 of the brake disc 1. Grooves 13 to 16 extend like a circular arc between the inner and outer fringe area 18 of the friction surface 4, 5, thereby sweeping the entire radial extension of the friction surfaces 4, 5.

Another advantage of the last-mentioned embodiment of the present invention is that due to the grooves 13 to 16 opening into the edge 18 of the brake disc 1, wear of the brake disc 1 cannot only be monitored by a visual check of the friction surfaces 4, 5 but also by a visual check of the edge 18 of the brake disc 1.

Beside the U-shaped groove contour shown in FIG. 4, of course, any other favorable contour may be provided. In particular, a V-shaped groove contour is recommended, should the rate of friction lining wear prove too high with a U-shaped groove contour.

What is claimed is:

1. A brake disc for disc brakes with a rotary axis and at least one friction surface including at least one groove which has a closed configuration and extends around the rotary axis and which is closed after a plurality of laps around the rotary axis, wherein each friction surface has radially inner and a radially outer fringe area with exactly one groove extending wavelike between the inner and the outer fringe area.

2. A brake disc for disc brakes with a rotary axis and at least one friction surface including a plurality of grooves which have a closed configuration without beginning and end and which each extend in a radial partial area of the friction surface around the rotary axis like a wave and which are offset relative to each other on the friction surface in a radial direction.

* * * * *